(12) United States Patent
Komano (10) Patent No.: US 8,579,490 B2
(45) Date of Patent: Nov. 12, 2013

(54) BACKLIGHT DEVICE AND DISPLAY DEVICE PROVIDED WITH THE SAME

(75) Inventor: Masakazu Komano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 390 days.

(21) Appl. No.: 13/054,574

(22) PCT Filed: May 15, 2009

(86) PCT No.: PCT/JP2009/059038
§ 371 (c)(1),
(2), (4) Date: Jan. 18, 2011

(87) PCT Pub. No.: WO2010/023996
PCT Pub. Date: Mar. 4, 2010

(65) Prior Publication Data
US 2011/0122651 A1    May 26, 2011

(30) Foreign Application Priority Data

Aug. 29, 2008    (JP) ................................. 2008-220916

(51) Int. Cl.
*F21V 7/04*    (2006.01)

(52) U.S. Cl.
USPC ............................. 362/611; 362/612; 362/621

(58) Field of Classification Search
USPC .................. 362/611, 612, 621, 97.2, 97.3
See application file for complete search history.

(56) References Cited

U.S. PATENT DOCUMENTS

| 7,748,862 B2 * | 7/2010 | Kim .............................. 362/97.2 |
| 2004/0090174 A1 | 5/2004 | Tasch et al. |
| 2006/0056200 A1 | 3/2006 | Yamashita et al. |
| 2006/0285353 A1 | 12/2006 | Kim |
| 2007/0008451 A1 | 1/2007 | Tanaka |
| 2007/0035967 A1 | 2/2007 | Song |
| 2008/0031010 A1 * | 2/2008 | Kim et al. ..................... 362/612 |

FOREIGN PATENT DOCUMENTS

| JP | 10-268271 A | 10/1998 |
| JP | 2007-41605 A | 2/2007 |
| JP | 2007-87618 A | 4/2007 |

(Continued)

OTHER PUBLICATIONS

English translation of Official Communication issued in corresponding Russian Patent Application No. 2011111716, mailed on Aug. 27, 2012.

(Continued)

*Primary Examiner* — David V Bruce
(74) *Attorney, Agent, or Firm* — Keating & Bennett, LLP (57) ABSTRACT

Provided is a backlight device which can suppress deterioration of uniformity. The backlight device (10) is provided with an LED (11), and a light guide plate (12) which includes a light incoming surface (12*a*) and a light outgoing surface (12*b*). An inclined surface (12*c*) which is inclined from the light outgoing surface is formed between the light incoming surface and the light outgoing surface of the light guide plate, and the light guide plate is formed such that the thickness of a portion on the light incoming surface side is more than that of a portion on the light outgoing surface side. At the front of the portion on the light incoming surface side of the light outgoing surface of the light guide plate, a regulating member (13), which has a light blocking characteristic and regulates shift of the light guide plate in the thickness direction of the light guide plate, is arranged.

20 Claims, 7 Drawing Sheets

(56) References Cited

FOREIGN PATENT DOCUMENTS

| JP | 2008-41637 A | 2/2008 |
| RU | 2 251 761 C2 | 5/2005 |
| RU | 2 360 180 C2 | 2/2009 |
| WO | 2004/076917 A | 9/2004 |

OTHER PUBLICATIONS

Official Communication issued in International Patent Application No. PCT/JP2009/059038 mailed on Jun. 9, 2009.

* cited by examiner

BACKLIGHT DEVICE AND DISPLAY DEVICE PROVIDED WITH THE SAME

TECHNICAL FIELD

This invention relates to a backlight device and a display device provided with the same, and relates particularly to a sidelight type backlight device and a display device provided with the same.

BACKGROUND ART

There is conventionally known a sidelight type backlight device (see, for example, Patent Document 1).

Patent Document 1 mentioned above discloses a backlight structural body (backlight device) of a sidelight type (referred to also as an edge-light type) including a light guide plate as well as an LED light source and a reflective structure that are disposed on a lateral side of the light guide plate.

In this backlight structural body, the light guide plate is formed so that its light incidence surface and its light output surface are orthogonal to each other. Light outputted from the LED light source becomes incident on the light incidence surface of the light guide plate by being reflected by the reflective structure and then is outputted from the light output surface.

There is also conventionally known a sidelight type backlight device including a light guide plate having an inclined surface inclined with respect to a light output surface.

Figure 10:
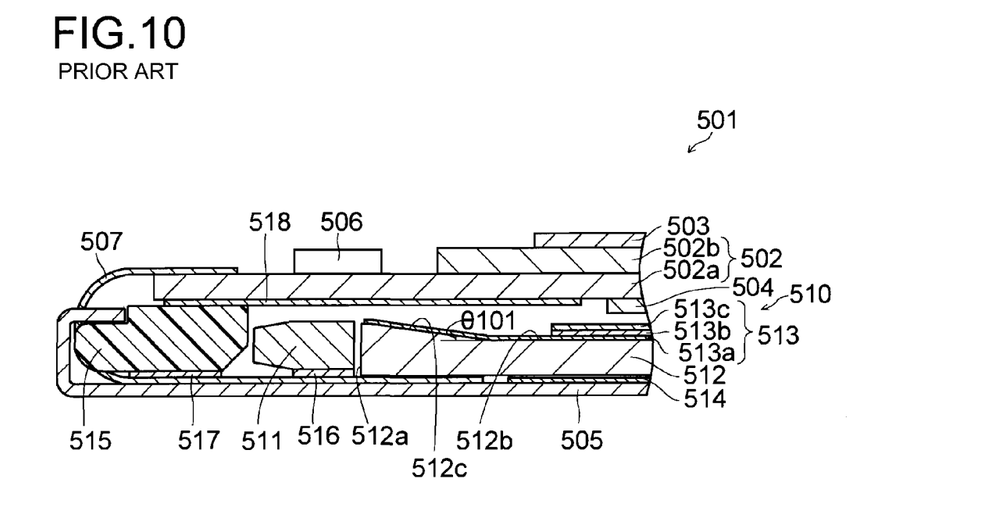
FIG. 10 A cross-sectional view showing the structure of a display device provided with a sidelight type backlight device according to a conventional example.

FIG. 10 is a cross-sectional view showing the structure of a display device provided with a sidelight type backlight device according to a conventional example. As shown in FIG. 10, a display device 501 provided with a sidelight type backlight device 510 according to a conventional example includes a display panel 502, an upper polarization plate 503 and a lower polarization plate 504 sandwiching the display panel 502 therebetween, the backlight device 510 disposed on a back surface side (lower side) of the display panel 502, and a metal frame 505 covering a back surface side portion of the backlight device 510.

The display panel 502 includes two transparent substrates 502a and 502b. Liquid crystal, which is not shown, is sealed in between the two substrates 502a and 502b. Furthermore, a driving IC (integrated circuit) 506 and an FPC (flexible printed circuit) 507 are attached to the front surface of the substrate 502a. The FPC 507 is bent at a predetermined position thereof so as to be disposed also on a back surface side of an after-mentioned frame 515.

The backlight device 510 includes a plurality of LEDs 511, a light guide plate 512 having a light incidence surface 512a on which light from the LEDs 511 becomes incident, a plurality of optical sheets 513 disposed in opposition to a light output surface 512b of the light guide plate 512, a reflection sheet 514 disposed on a back surface side of the light guide plate 512, and the frame-shaped frame 515 that houses these components.

The plurality of LEDs 511 are fixed to the FPC 507 via a solder layer 516 and disposed so as to be opposed to the light incidence surface 512a of the light guide plate 512.

A portion of the FPC 507, which is disposed on the back surface side of the frame 515, is bonded to the frame 515 by use of an adhesive member 517 made of a double-sided adhesive tape or the like.

The light guide plate 512 is formed so that the light incidence surface 512a and the light output surface 512b are substantially orthogonal to each other. Furthermore, an inclined surface 512c inclined at an angle θ 101 (e.g. 6°) with respect to the light output surface 512b is formed between the light incidence surface 512a and the light output surface 512b of the light guide plate 512. That is, the light guide plate 512 is formed so as to have a thickness larger at a portion on the side of the light incidence surface 512a (side of the LEDs 511) than at a portion on the side of the light output surface 512b.

Furthermore, the light guide plate 512 is disposed at a predetermined distance from an after-mentioned adhesive member 518.

The plurality of optical sheets 513 are composed of a diffusion sheet 513a, a lower lens sheet 513b, and an upper lens sheet 513c.

The frame 515 is bonded to the display panel 502 by use of the adhesive member 518 made of a double-sided adhesive tape or the like.

In the backlight device 510, as described above, the light guide plate 512 is formed so as to have a thickness larger at the portion on the side of the light incidence surface 512a (side of the LEDs 511) than at the portion on the side of the light output surface 512b, and thus an increased proportion of light outputted from the LEDs 511 can be made incident on the light guide plate 512.

Furthermore, the light guide plate 512 can be made thinner at the portion thereof on the side of the light output surface 512b, and thus the backlight device 510 (display device 501) as a whole can be reduced in thickness.

Furthermore, in the backlight device 510, since the light guide plate 512 is disposed at a predetermined distance from the adhesive member 518, it is possible to prevent light incident on the light guide plate 512 from being outputted to the side of the adhesive member 518 to be absorbed by the adhesive member 518. If the light guide plate 512 is bonded to the adhesive member 518, light incident on the light guide plate 512 is likely to be outputted from a portion of the light guide plate 512 where the light guide plate 512 is bonded to the adhesive member 518. Light outputted from the light guide plate 512 then is absorbed by the adhesive member 518. Because of this, if the light guide plate 512 is bonded to the adhesive member 518, light use efficiency is deteriorated, which leads to a decrease in the luminance of the display panel 502.

LIST OF CITATIONS

Patent Literature

Patent Document 1: JP-A-2007-41605

SUMMARY OF THE INVENTION

Technical Problems

In the display device 501 provided with the backlight device 510 according to the conventional example, however, since the inclined surface 512c inclined with respect to the light output surface 512b is formed on the light guide plate 512, part of light incident on the light guide plate 512 is outputted from the inclined surface 512c to the side of the display panel 502. This leads to a disadvantage that the display panel 502 exhibits a high (increased) luminance at a portion thereof in the vicinity of the LEDs 511 compared with a luminance at a portion thereof other than the vicinity of the LEDs 511. That is, there is a problem that the uniformity ratio is deteriorated.

Furthermore, in the display device 501, since the light guide plate 512 is disposed at a predetermined distance from the adhesive member 518, the light guide plate 512 is movable in the thickness direction. This leads to a disadvantage that, at the time of assembly or the like, the light guide plate 512 as a whole may become inclined with respect to the display panel 502. If the light guide plate 512 as a whole becomes inclined with respect to the display panel 502 as described above, there arises a disadvantage that the display panel 502 exhibits a high luminance at a portion thereof on the side of the LEDs 511 (a low luminance at a portion thereof on the side opposite to the LEDs 511), or a low luminance at the portion thereof on the side of the LEDs 511 (a high luminance at the portion thereof on the side opposite to the LEDs 511). Because of this, there is a problem that the uniformity ratio is further deteriorated.

In order to solve the above-described problems, it is an object of this invention to provide a backlight device that can suppress deterioration in uniformity ratio, and a display device provided with the same.

Solution to the Problems

In order to achieve the above-described object, a backlight device according to a first aspect of this invention is a sidelight type backlight device and includes: a light-emitting element; a light guide plate that includes a light incidence surface on which light from the light-emitting element becomes incident and a light output surface from which incident light is outputted to the side of a display panel; and an optical sheet that is disposed in opposition to the light output surface of the light guide plate. In the backlight device, an inclined surface inclined with respect to the light output surface is formed between the light incidence surface and the light output surface of the light guide plate. Further, the light guide plate is formed so as to have a thickness larger at a portion on the side of the light incidence surface than at a portion on the side of the light output surface, and a restriction member that has a light-blocking property and restricts the light guide plate from being moved in the thickness direction of the light guide plate is disposed forward of a portion of the light output surface of the light guide plate on the side of the light incidence surface.

In this backlight device according to the first aspect, as described above, the restriction member having a light-blocking property is disposed forward of the portion of the light output surface of the light guide plate on the side of the light incidence surface. Thus, even in a case where part of light incident on the light guide plate is outputted from the inclined surface to the side of the display panel, the restriction member having a light-blocking property can prevent light outputted from the light guide plate from reaching the display panel. This can prevent a phenomenon in which the display panel exhibits a high (increased) luminance at a portion thereof in the vicinity of the light-emitting element compared with a luminance at a portion thereof other than the vicinity of the light-emitting element. As a result, deterioration in uniformity ratio can be suppressed.

Furthermore, in the backlight device according to the first aspect, as described above, the restriction member that restricts the light guide plate from being moved in the thickness direction of the light guide plate is disposed forward of the portion of the light output surface of the light guide plate on the side of the light incidence surface, and thus the light guide plate can be prevented from being moved in the thickness direction. This can prevent the light guide plate as a whole from being inclined with respect to the display panel, and thus a phenomenon can be prevented in which the display panel exhibits a high luminance at a portion thereof on the side of the light-emitting element (a low luminance at a portion thereof on the side opposite to the light-emitting element), or a low luminance at the portion thereof on the side of the light-emitting element (a high luminance at the portion thereof on the side opposite to the light-emitting element). As a result, deterioration in uniformity ratio can be further suppressed.

Furthermore, in the backlight device according to the first aspect, as described above, the light guide plate is formed so as to have a thickness larger at the portion on the side of the light incidence surface than at the portion on the side of the light output surface, and thus the area of the light incidence surface can be increased. Thus, an increased proportion of light outputted from the light-emitting element can be made incident on the light guide plate, so that improved luminance can be obtained.

Furthermore, in the backlight device according to the first aspect, as described above, the light guide plate is formed so as to have a thickness larger at the portion on the side of the light incidence surface than at the portion on the side of the light output surface, and thus the light guide plate can be made thinner at the portion thereof on the side of the light output surface, thereby allowing a reduction in the thickness of the backlight device as a whole.

In the above-described backlight device according to the first aspect, preferably, there are further provided: a frame that houses the light-emitting element, the light guide plate, and the optical sheet; and an adhesive member for fixing the display panel to the frame, and the restriction member is bonded to the adhesive member. According to this configuration, it is easily possible to prevent the restriction member from being moved relative to the frame, the light guide plate, and the like.

In the above-described backlight device according to the first aspect, preferably, there is further provided a resinous frame that houses the light-emitting element, the light guide plate, and the optical sheet, and the restriction member is formed integrally with the frame. According to this configuration, it is easily possible to prevent the restriction member from being moved relative to the light guide plate and the like. Furthermore, compared with a case where the restriction member is formed as a separate body from the frame, the number of components used can be reduced, and the assembly process can be simplified.

In the above-described backlight device according to the first aspect, preferably, the restriction member is fixed to the optical sheet. According to this configuration, the restriction member can be prevented from being moved relative to the optical sheet, and the positional accuracy of the restriction member with respect to the light guide plate can be improved.

In the above-described backlight device in which the restriction member is fixed to the optical sheet, it is also possible that the optical sheet is configured to include a diffusion sheet disposed in contact with the light output surface of the light guide plate, and the restriction member is fixed to the diffusion sheet.

In the above-described backlight device according to the first aspect, preferably, the restriction member is formed by bonding a wide sheet member disposed forward of the light incidence surface and the light output surface of the light guide plate to a narrow sheet member disposed forward of the light output surface of the light guide plate. According to this configuration, simply by bonding the wide sheet member to the narrow sheet member, the restriction member can be formed so as to have a cross section of, for example, an L shape. Thus, compared with a case where the restriction member is formed so as to have an L-shaped cross section by, for example, resin molding using a mold, the restriction member having an L-shaped cross section can be easily formed. Furthermore, the wide sheet member of the restriction member is disposed forward of the light incidence surface and the light output surface of the light guide plate, and thus, even in a case where, for example, an adhesive member is disposed forward of the light guide plate, it is possible to prevent the light guide plate from being bonded to the adhesive member. This can prevent light incident on the light guide plate from being outputted to the side of the adhesive member to be absorbed by the adhesive member, and thus it is possible to suppress deterioration in light use efficiency that leads to a decrease in the luminance of the display panel. If the light guide plate is bonded to the adhesive member, light incident on the light guide plate is likely to be outputted from a portion of the light guide plate where the light guide plate is bonded to the adhesive member. Light outputted from the light guide plate then is absorbed by the adhesive member. Because of this, light use efficiency is deteriorated, which leads to a decrease in the luminance of the display panel.

In the above-described backlight device in which the restriction member is formed by the wide sheet member and the narrow sheet member, preferably, there is further provided a frame that houses the light-emitting element, the light guide plate, and the optical sheet, and the frame has a function of preventing the wide sheet member of the restriction member from being moved in the plane direction of the wide sheet member. According to this configuration, it is easily possible to prevent the restriction member from being moved in the plane direction.

In the above-described backlight device according to the first aspect, preferably, the restriction member has a function of reflecting light. According to this configuration, light outputted from the inclined surface of the light guide plate can be reflected by the restriction member, and thus light outputted from the inclined surface of the light guide plate can be made incident again on the light guide plate. Thus, light use efficiency can be improved, which leads to an increase in the luminance of the display panel.

In the above-described backlight device according to the first aspect, preferably, there are further provided: a frame that houses the light-emitting element, the light guide plate, and the optical sheet; and an adhesive member for fixing the display panel to the frame. Further, at least part of the adhesive member is disposed forward of the light incidence surface of the light guide plate, and a distance between the light output surface of the light guide plate or the optical sheet and the restriction member is smaller than a distance between the portion of the light guide plate on the side of the light incidence surface and the adhesive member. According to this configuration, it is possible to prevent an increase in the distance between the light output surface of the light guide plate or the optical sheet and the restriction member, and thus the light guide plate can be easily restricted from being moved in the thickness direction of the light guide plate. Thus, it is easily possible to prevent the light guide plate as a whole from being inclined with respect to the display panel, so that deterioration in uniformity ratio can be easily suppressed.

In the above-described backlight device according to the first aspect, preferably, the light-emitting element includes: a light-emitting chip; a package main body portion that has a concave portion for housing the light-emitting chip; and a filler that is filled in the concave portion of the package main body portion so as to cover the light-emitting chip. Further, the light incidence surface of the light guide plate is formed so as to extend to a position more forward than the concave portion of the package main body portion. According to this configuration, an increased proportion of light outputted from the light-emitting element can be made incident on the light guide plate. Thus, the luminance of the display panel can be further improved.

A display device according to a second aspect of this invention includes: the backlight device having any of the above-described configurations; and a display panel that is illuminated by the backlight device. According to this configuration, the display device that can suppress deterioration in uniformity ratio can be obtained.

Advantageous Effects of the Invention

As described thus far, according to the present invention, it is easily possible to obtain a backlight device that can suppress deterioration in uniformity ratio, and a display device provided with the same.

DESCRIPTION OF EMBODIMENTS

First Embodiment

Referring to FIGS. 1 to 4, the following describes the structure of a liquid crystal display device 1 provided with a backlight device 10 according to a first embodiment of the present invention. The liquid crystal display device 1 is an example of the "display device" of the present invention.

Figure 1:
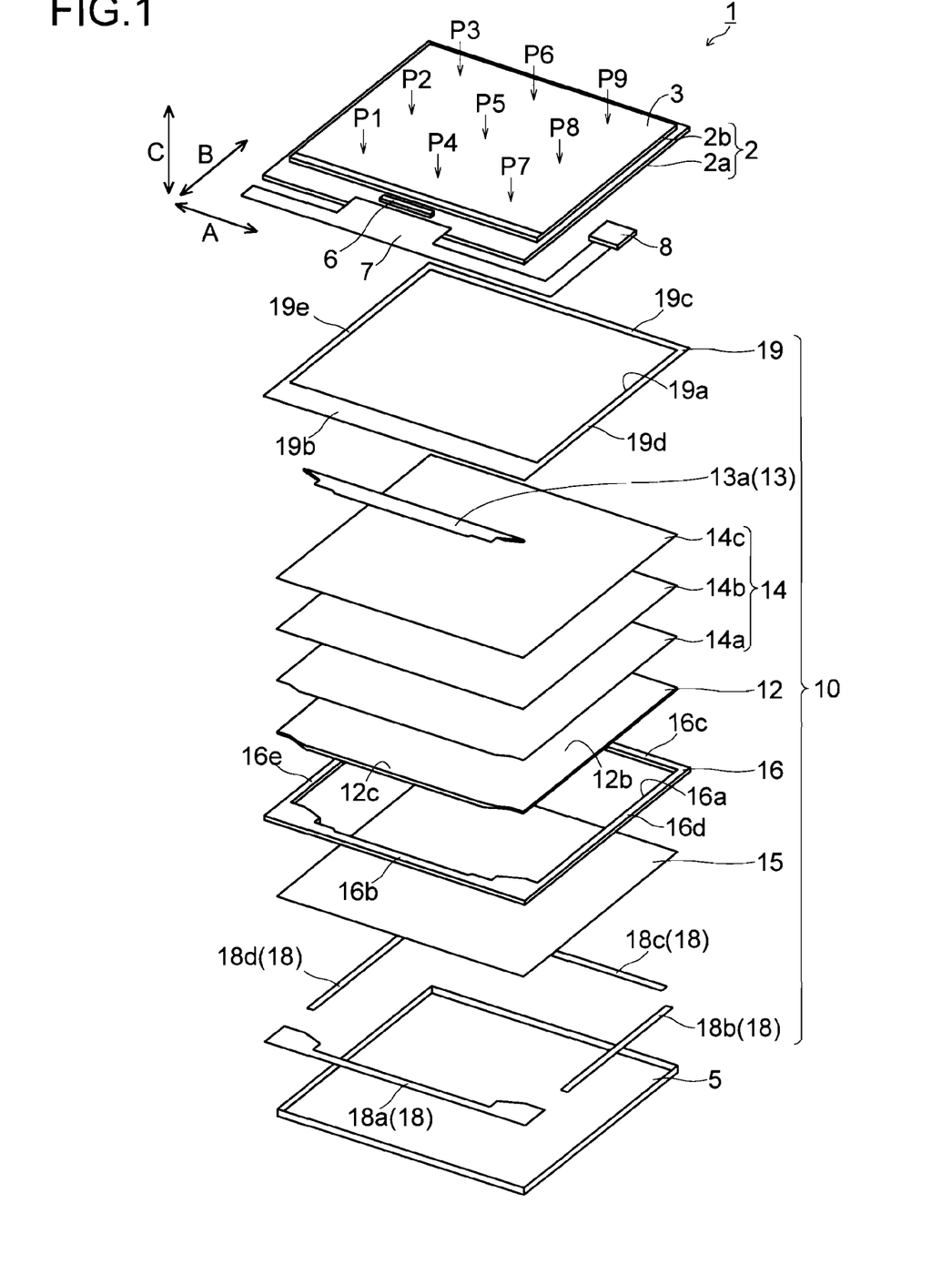
FIG. 1 An exploded perspective view showing the structure of a liquid crystal display device provided with a backlight device according to a first embodiment of the present invention.

The liquid crystal display device 1 provided with the backlight device 10 according to the first embodiment of the present invention is used in electronic equipment such as a mobile telephone. Furthermore, as shown in FIG. 1, the liquid crystal display device 1 is composed of a liquid crystal display panel 2, an upper polarization plate 3 and a lower polarization plate 4 (see FIG. 2) sandwiching the liquid crystal display panel 2 therebetween, the backlight device 10 disposed on a back surface side (lower side) of the liquid crystal display panel 2, and a metal frame 5 covering a back surface side portion of the backlight device 10. The liquid crystal display panel 2 is an example of the "display panel" of the present invention.

Figure 2:
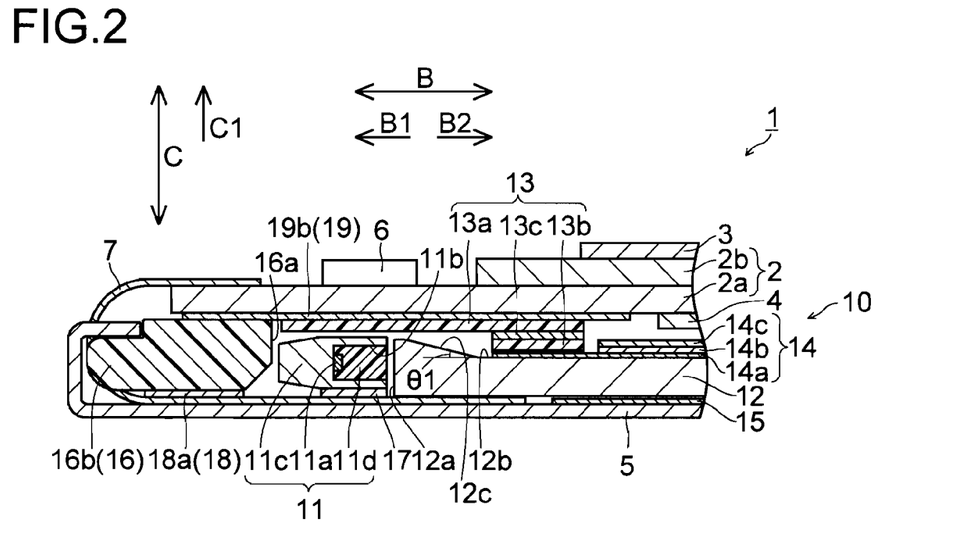
FIG. 2 A cross-sectional view showing the structure of the liquid crystal display device provided with the backlight device according to the first embodiment of the present invention, which is shown in FIG. 1.

As shown in FIG. 2, the liquid crystal display panel 2 includes a transparent AM substrate (active matrix substrate) 2a and a transparent opposed substrate 2b that is disposed in opposition to the AM substrate 2a and has an area smaller than that of the AM substrate 2a. Furthermore, liquid crystal, which is not shown, is sealed in between the AM substrate 2a and the opposed substrate 2b. The liquid crystal display panel 2 is illuminated by the backlight device 10 and thereby functions as a display panel.

A driving IC 6 and an FPC 7 are attached to the front surface of the AM substrate 2a. The FPC 7 is bent at a predetermined position thereof so as to be disposed also on a back surface side of an after-mentioned frame 16. Furthermore, as shown in FIG. 1, a connector member 8 for establishing electrical connection with the exterior is attached to an end portion of the FPC 7.

Furthermore, as shown in FIGS. 1 and 2, the liquid crystal display panel 2 is bonded (fixed) to the front surface of the after-mentioned frame 16 by use of an after-mentioned adhesive member 19 made of a double-sided adhesive tape or the like.

In the first embodiment, as shown in FIG. 2, the backlight device 10 is a sidelight type (edge-light type) backlight device and includes a plurality of LEDs 11, a light guide plate 12 having a light incidence surface 12a on which light from the LEDs 11 becomes incident, a restriction member 13 and a plurality of optical sheets 14 that are disposed in opposition to a light output surface 12b of the light guide plate 12, a reflection sheet 15 disposed on a back surface side of the light guide plate 12, and the resinous frame 16 that houses these components. The LEDs 11 are an example of the "light-emitting element" of the present invention.

The plurality of LEDs 11 are fixed to the FPC 7 via a solder layer 17. Furthermore, the plurality of LEDs 11 are disposed at a predetermined pitch in an A direction (see FIG. 3) so as to be opposed to the light incidence surface 12a of the light guide plate 12.

Furthermore, each of the LEDs 11 is composed of a blue light-emitting chip 11a, a package main body portion 11c having a concave portion 11b for housing the blue light-emitting chip 11a, and a filler 11d filled in the concave portion 11b of the package main body portion 11c so as to cover the blue light-emitting chip 11a. The filler 11d is made of a transparent resin containing a fluorescent material and the like. The blue light-emitting chip 11a is an example of the "light-emitting chip" of the present invention.

A portion of the FPC 7, which is disposed on the back surface side of the frame 16, is bonded to the back surface of the frame 16 by use of an adhesive member 18 made of a double-sided adhesive tape or the like.

As shown in FIG. 1, the adhesive member 18 includes one FPC-bonding portion 18a and three metal frame-bonding portions 18b, 18c, and 18d. The FPC-bonding portion 18a bonds the frame 16 to the FPC 7. Furthermore, the three metal frame-bonding portions 18b, 18c, and 18d bond the frame 16 to the metal frame 5.

As shown in FIG. 2, the light guide plate 12 is disposed at a predetermined distance from the after-mentioned adhesive member 19. Furthermore, the light guide plate 12 is formed so that the light incidence surface 12a and the light output surface 12b extend in directions orthogonal to each other, respectively. Furthermore, the light guide plate 12 has a function of making light from the LEDs 11 incident from the light incidence surface 12a and outputting the light from the light output surface 12b toward the side of the liquid crystal display panel 2 (C1 direction).

Furthermore, an inclined surface 12c inclined at an angle θ1 (e.g. 12°) with respect to the light output surface 12b is formed between the light incidence surface 12a and the light output surface 12b of the light guide plate 12. That is, the light guide plate 12 is formed so as to have a thickness larger at a portion on the side of the light incidence surface 12a (side of the LEDs 11) than at a portion on the side of the light output surface 12b. Specifically, the light guide plate 12 has a thickness of, for example, 0.6 mm at the portion on the side of the light incidence surface 12a (side of the LEDs 11) and a thickness of, for example, 0.42 mm at the portion on the side of the light output surface 12b.

Furthermore, the light incidence surface 12a of the light guide plate 12 is formed so as to extend to a position more forward (C1 direction) than the concave portion 11b of the package main body portion 11c of each of the LEDs 11.

Furthermore, in the first embodiment, the restriction member 13 is in white color and has a function of reflecting light and a light-blocking property. Furthermore, the restriction member 13 is disposed forward (C1 direction) of a portion of the light output surface 12b of the light guide plate 12 on the side of the LEDs 11 (side of a B1 direction).

Furthermore, in the first embodiment, the restriction member 13 is composed of a wide sheet member 13a disposed forward of the light incidence surface 12a, the inclined surface 12c, and the light output surface 12b of the light guide plate 12, a narrow sheet member 13b disposed forward of the light output surface 12b of the light guide plate 12, and an adhesive member 13c that bonds together the wide sheet member 13a and the narrow sheet member 13b. The restriction member 13 therefore has an L-shaped cross section.

Furthermore, the wide sheet member 13a and the narrow sheet member 13b are made of an identical material (e.g. a resin such as PET (polyethylene terephthalate)) and are identical in thickness.

Furthermore, in the first embodiment, the restriction member 13 has a function of restricting the light guide plate 12 from being moved in the thickness direction of the light guide plate 12 (C direction). Specifically, the wide sheet member 13a (restriction member 13) is bonded (fixed) to the after-mentioned adhesive member 19. Furthermore, the restriction member 13 is formed so that a distance (e.g. several tens of μm) between the light output surface 12b of the light guide plate 12 (an after-mentioned diffusion sheet 14a among the optical sheets 14) and the narrow sheet member 13b of the restriction member 13 is smaller than a distance between the portion of the light guide plate 12 on the side of the light incidence surface 12a and the wide sheet member 13a of the restriction member 13 or the adhesive member 19. Thus, the light guide plate 12 is restricted from being moved in the thickness direction (C direction).

The plurality of optical sheets 14 are composed of the diffusion sheet 14a that is disposed in contact with the light guide plate 12 and has a function of diffusing light, and a lower lens sheet 14b and an upper lens sheet 14c that are disposed forward (C1 direction) of the diffusion sheet 14a and have a function of condensing light.

The reflection sheet 15 has a function of reflecting light outputted from the back surface of the light guide plate 12 and making the light travel to the side of the light guide plate 12 (C1 direction).

Figure 4:
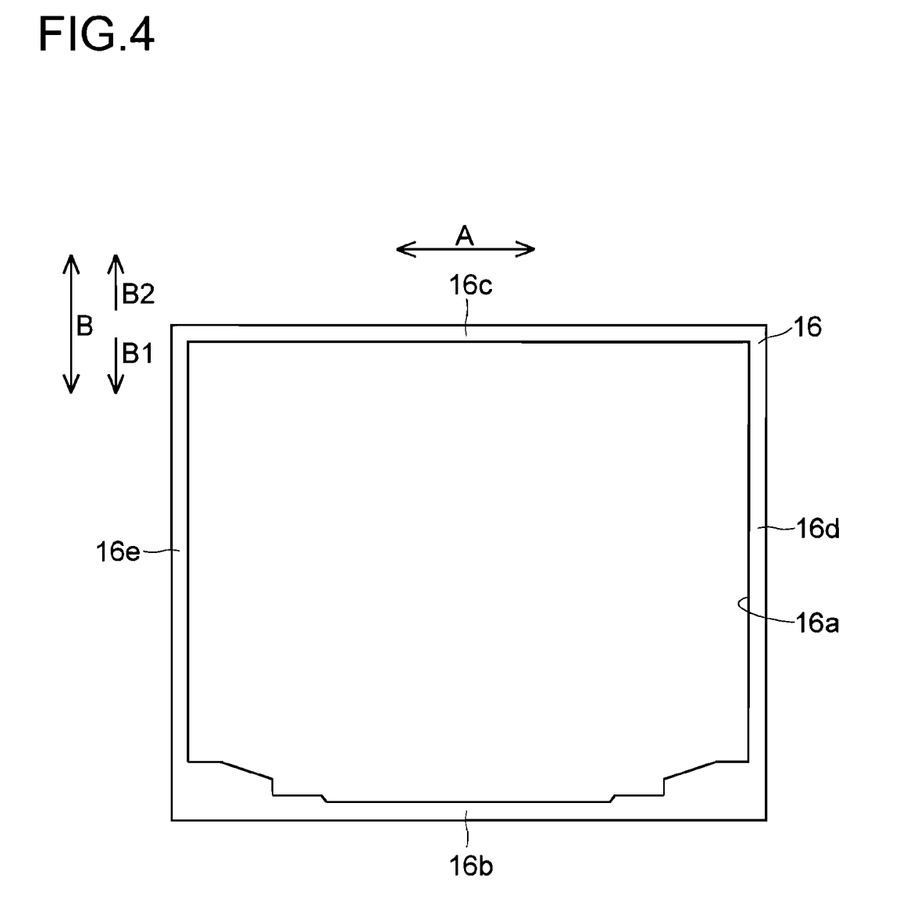
FIG. 4 A plan view showing the structure of the frame of the backlight device shown in FIG. 1.

The frame 16 houses the plurality of LEDs 11, the light guide plate 12, the plurality of optical sheets 14, and the like. Furthermore, as shown in FIG. 4, the frame 16 has an opening 16*a* and is formed in the shape of a frame defined by long side portions 16*b* and 16*c* and short side portions 16*d* and 16*e*.

Figure 3:
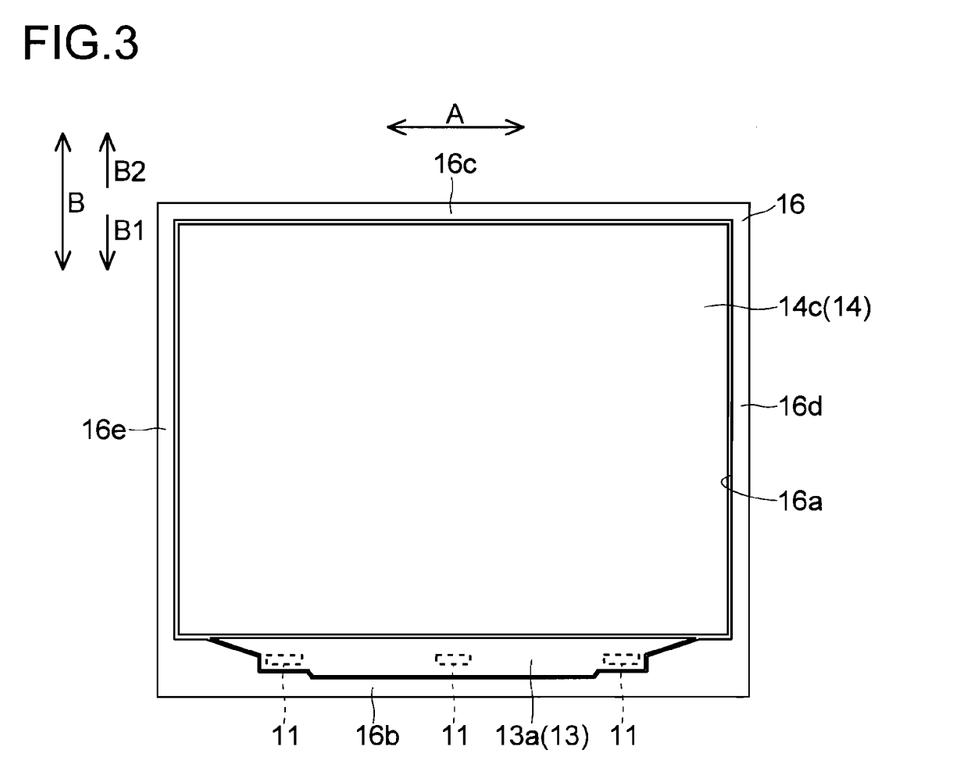
FIG. 3 A plan view showing the structures of a frame, optical sheets, and a restriction member of the backlight device shown in FIG. 1.

As shown in FIG. 3, the plurality of optical sheets 14 are disposed in a portion surrounded by the long side portion 16*c* and the short side portions 16*d* and 16*e*. This can prevent the optical sheets 14 from being moved in the plane direction (A direction and B direction). Similarly to the optical sheets 14, the light guide plate 12 is also prevented from being moved in the plane direction (A direction and B direction).

Furthermore, the restriction member 13 is disposed at a portion of the opening 16*a* on the side of the long side portion 16*b*. The portion of the opening 16*a* on the side of the long side portion 16*b* is formed in substantially the same shape as the wide sheet member 13*a* of the restriction member 13.

Furthermore, in the first embodiment, the long side portion 16*b* of the frame 16 has a function of preventing (restricting) the wide sheet member 13*a* of the restriction member 13 from being moved in the plane direction (A direction and B1 direction), and the optical sheets 14 (lower lens sheet 14*b* and upper lens sheet 14*c*) have a function of preventing (restricting) the wide sheet member 13*a* of the restriction member 13 from being moved in the plane direction (B2 direction).

Specifically, in assembling the backlight device 10, as shown in FIG. 2, in a state where the light guide plate 12 and the plurality of optical sheets 14 are disposed in the opening 16*a* of the frame 16, the restriction member 13 is disposed forward (C1 direction) of the light guide plate 12. At this time, as shown in FIG. 3, the long side portion 16*b* of the frame 16 prevents (restricts) the wide sheet member 13*a* of the restriction member 13 from being moved in the plane direction (A direction and B1 direction). Furthermore, at this time, the lower lens sheet 14*b* and the upper lens sheet 14*c* among the optical sheets 14 prevent (restrict) the wide sheet member 13*a* of the restriction member 13 from being moved in the plane direction (B2 direction). In this manner, the positioning of the restriction member 13 is achieved. Then, in a state where the position of the restriction member 13 is thus set, the adhesive member 19 is bonded to the frame 16 and the restriction member 13, and the restriction member 13 is thereby fixed.

Furthermore, as shown in FIG. 1, the adhesive member 19 that bonds (fixes) the frame 16 to the liquid crystal display panel 2 has an opening 19*a* and is formed in the shape of a frame defined by long side portions 19*b* and 19*c* and short side portions 19*d* and 19*e*.

The long side portion 19*b* has a width larger than that of the long side portion 16*b* of the frame 16. Furthermore, as shown in FIG. 2, the long side portion 19*b* is disposed so as to extend to a position forward of the light incidence surface 12*a*, the inclined surface 12*c*, and the light output surface 12*b* of the light guide plate 12.

In the first embodiment, as described in the foregoing, the restriction member 13 having a light-blocking property is disposed forward (C1 direction) of the portion of the light output surface 12*b* of the light guide plate 12 on the side of the light incidence surface 12*a* (side of the LEDs 11). Thus, even in a case where part of light incident on the light guide plate 12 is outputted from the inclined surface 12*c* to the side of the liquid crystal display panel 2, it is possible to prevent light outputted from the light guide plate 12 from reaching the liquid crystal display panel 2. This can prevent a phenomenon in which the liquid crystal display panel 2 exhibits a high (increased) luminance at a portion thereof in the vicinity of the LEDs 11 compared with a luminance at a portion thereof other than the vicinity of the LEDs 11. As a result, deterioration in uniformity ratio can be suppressed.

Furthermore, in the first embodiment, as described in the foregoing, the restriction member 13 that restricts the light guide plate 12 from being moved in the thickness direction of the light guide plate 12 (C direction) is disposed forward of the portion of the light output surface 12*b* of the light guide plate 12 on the side of the light incidence surface 12*a* (side of the LEDs 11), and thus the light guide plate 12 can be prevented from being moved in the thickness direction. This can prevent the light guide plate 12 as a whole from being inclined with respect to the liquid crystal display panel 2, and thus a phenomenon can be prevented in which the liquid crystal display panel 2 exhibits a high luminance at a portion thereof on the side of the LEDs 11 (a low luminance at a portion thereof on the side opposite to the LEDs 11), or a low luminance at the portion thereof on the side of the LEDs 11 (a high luminance at the portion thereof on the side opposite to the LEDs 11). As a result, deterioration in uniformity ratio can be further suppressed.

Furthermore, in the first embodiment, as described in the foregoing, the light guide plate 12 is formed so as to have a thickness larger at the portion on the side of the light incidence surface 12*a* than at the portion on the side of the light output surface 12*b*, and thus the area of the light incidence surface 12*a* can be increased. Thus, an increased proportion of light outputted from the LEDs 11 can be made incident on the light guide plate 12, so that the luminance of the liquid crystal display panel 2 can be improved.

Furthermore, in the first embodiment, as described in the foregoing, the light guide plate 12 is formed so as to have a thickness larger at the portion on the side of the light incidence surface 12*a* than at the portion on the side of the light output surface 12*b*, and thus the light guide plate 12 can be made thinner at the portion thereof on the side of the light output surface 12*b*, thereby allowing a reduction in the thickness of the backlight device 10 (liquid crystal display device 1) as a whole.

Furthermore, in the first embodiment, as described in the foregoing, the restriction member 13 is fixed (bonded) to the adhesive member 19, and thus it is easily possible to prevent the restriction member 13 from being moved relative to the frame 16, the light guide plate 12, and the like.

Furthermore, in the first embodiment, as described in the foregoing, the restriction member 13 is formed by bonding the wide sheet member 13*a* to the narrow sheet member 13*b*, and thus, simply by bonding the wide sheet member 13*a* to the narrow sheet member 13*b*, the restriction member 13 can be formed so as to have an L-shaped cross section. Thus, compared with a case where the restriction member 13 is formed so as to have an L-shaped cross section by, for example, resin molding using a mold, the restriction member 13 having an L-shaped cross section can be easily formed. Furthermore, the wide sheet member 13*a* of the restriction member 13 is disposed forward of the light incidence surface 12*a* and the light output surface 12*b* of the light guide plate 12, and thus it is possible to prevent the light guide plate 12 from being bonded to the adhesive member 19. This can prevent light incident on the light guide plate 12 from being outputted to the side of the adhesive member 19 to be absorbed by the adhesive member 19, and thus it is possible to suppress deterioration in light use efficiency that leads to a decrease in the luminance of the liquid crystal display panel 2. If the light guide plate 12 is bonded to the adhesive member 19, light incident on the light guide plate 12 is likely to be outputted from a portion of the light guide plate 12 where the light guide plate 12 is bonded to the adhesive member 19. Light outputted from the light guide plate 12 then is absorbed by the adhesive member 19. Because of this, light use efficiency is deteriorated, which leads to a decrease in the luminance of the liquid crystal display panel 2.

Furthermore, in the first embodiment, as described in the foregoing, the long side portion 16b of the frame 16 is configured to have a function of preventing (restricting) the wide sheet member 13a of the restriction member 13 from being moved in the plane direction (A direction and B direction), and thus, at the time of assembly, it is easily possible to prevent the restriction member 13 from being moved in the plane direction. This can facilitate assembling the backlight device 10.

Furthermore, in the first embodiment, as described in the foregoing, the restriction member 13 is formed in white color, and thus, compared with a case where the restriction member 13 is in, for example, black color, the light reflectivity of the restriction member 13 can be increased. As a result of this, an increased proportion of light outputted from the inclined surface 12c of the light guide plate 12 can be reflected by the restriction member 13, and thus an increased proportion of light outputted from the inclined surface 12c of the light guide plate 12 can be made incident again on the light guide plate 12. Thus, light use efficiency can be improved, which leads to an increase in the luminance of the liquid crystal display panel 2.

Furthermore, in the first embodiment, as described in the foregoing, the light incidence surface 12a of the light guide plate 12 is formed so as to extend to a position more forward than the concave portion 11b of the package main body portion 11c, and thus an increased proportion of light outputted from the LEDs 11 can be made incident on the light incidence surface 12a of the light guide plate 12. This can further improve the luminance of the liquid crystal display panel 2.

Furthermore, in the first embodiment, as described in the foregoing, the wide sheet member 13a and the narrow sheet member 13b are made of an identical material and are identical in thickness. The wide sheet member 13a and the narrow sheet member 13b can therefore be formed using an identical material (sheet member), and thus the manufacturing cost can be reduced.

Next, the following describes comparative experiments performed to confirm the effects of the liquid crystal display device 1 provided with the backlight device 10 according to the foregoing first embodiment of the present invention. These comparative experiments used a liquid crystal display device according to a working example corresponding to the foregoing first embodiment and a liquid crystal display device according to a comparative example that, unlike the above-described working example, did not include a restriction member. The comparative experiments thus were performed with respect to the liquid crystal display devices according to the working example and the comparative example, respectively.

The description is directed first to the experiment in which a comparison of the uniformity ratio was made between the liquid crystal display devices according to the working example and the comparative example, respectively. In this comparative experiment, 30 units of each of the liquid crystal display devices according to the working example and the comparative example, respectively, were prepared as samples. The liquid crystal display device according to the comparative example had the same structure as that of the liquid crystal display device according to the working example, except that it did not include a restriction member.

With respect to each of the samples of the liquid crystal display devices, luminance values at nine points (Points P1 to P9 in FIG. 1) on the liquid crystal display panel 2 (upper polarization plate 3) were measured, and the maximum value of the luminance values thus measured at the nice points (Points P1 to P9) was divided by the minimum value of the thus measured luminance values to determine a uniformity ratio. With respect to the 30 units of each of the liquid crystal display devices according to the working example and the comparative example, respectively, the mean value, the maximum value, and the minimum value of the uniformity ratios thus determined are shown in Table 1 below.

TABLE 1

|  | Uniformity Ratio of Working Example | Uniformity Ratio of Comparative Example |
| --- | --- | --- |
| Mean Value | 1.13 | 1.21 |
| Maximum Value | 1.19 | 1.37 |
| Minimum Value | 1.10 | 1.12 |
| Standard Deviation | 0.03 | 0.06 |

As shown in Table 1 above, it was found that, compared with the liquid crystal display device according to the comparative example, the liquid crystal display device according to the working example has an improved uniformity ratio (approximate to 1). Specifically, the samples of the liquid crystal display device according to the working example exhibited uniformity ratios with a mean value of about 1.13, a maximum value of about 1.19, a minimum value of about 1.10, and a standard deviation of about 0.03. On the other hand, the samples of the liquid crystal display device according to the comparative example exhibited uniformity ratios with a mean value of about 1.21, a maximum value of about 1.37, a minimum value of about 1.12, and a standard deviation of about 0.06.

Conceivably, these results are attributable to the following. That is, in the liquid crystal display device according to the working example, the restriction member 13 having a light-blocking property was disposed forward of the portion of the light output surface 12b of the light guide plate 12 on the side of the light incidence surface 12a (side of the LEDs 11), and thus, even in a case where part of light incident on the light guide plate 12 was outputted from the inclined surface 12c to the side of the liquid crystal display panel 2, it was possible to prevent light outputted from the light guide plate 12 from reaching the liquid crystal display panel 2. This could prevent a phenomenon in which the liquid crystal display panel 2 exhibits a high (increased) luminance at a portion thereof in the vicinity of the LEDs 11 compared with a luminance at a portion thereof other than the vicinity of the LEDs 11. This conceivably led to an improvement in uniformity ratio.

Furthermore, in the liquid crystal display device according to the working example, the restriction member 13 that restricted the light guide plate 12 from being moved in the thickness direction (C direction) was disposed forward of the portion of the light output surface 12b of the light guide plate 12 on the side of the light incidence surface 12a (side of the LEDs 11), and thus the light guide plate 12 could be prevented from being moved in the thickness direction. This could prevent the light guide plate 12 as a whole from being inclined with respect to the liquid crystal display panel 2, and thus a phenomenon could be prevented in which the liquid crystal display panel 2 exhibits a high luminance at a portion thereof on the side of the LEDs 11 (a low luminance at a portion thereof on the side opposite to the LEDs 11), or a low luminance at the portion thereof on the side of the LEDs 11 (a high luminance at the portion thereof on the side opposite to the LEDs 11). This conceivably led to a further improvement in uniformity ratio.

Furthermore, in the liquid crystal display device according to the working example, the light guide plate 12 could be prevented from being moved in the thickness direction, and thus variations in the amount of light entering the light guide plate 12 could be prevented. This conceivably led to a decrease in the standard deviation of the uniformity ratios (a decrease in variations).

The description is directed next to the experiment in which a comparison of luminance was made between the liquid crystal display devices according to the working example and the comparative example, respectively. In this comparative experiment, a luminance value on the center (Point P5 in FIG. 1) of the liquid crystal display panel 2 (upper polarization plate 3) was compared between the liquid crystal display devices according to the working example and the comparative example, respectively. Specifically, with respect to the 30 units of each of the liquid crystal display devices according to the working example and the comparative example, respectively, a mean luminance value was determined based on the respective luminance values at Point P5 measured in the above-described comparative experiment for a comparison of the uniformity ratio.

In this comparative experiment, it was found that, compared with the liquid crystal display device according to the comparative example, the liquid crystal display device according to the working example has improved luminance. Specifically, the samples of the liquid crystal display device according to the working example exhibited a mean luminance value of about 296 (cd/m$^2$). On the other hand, the samples of the liquid crystal display device according to the comparative example exhibited a mean luminance value of about 292 (cd/m$^2$).

Conceivably, these results are attributable to the following. That is, in the liquid crystal display device according to the working example, the restriction member 13 was formed so as to have a function of reflecting light, and thus light outputted from the inclined surface 12c of the light guide plate 12 could be reflected by the restriction member 13, so that light outputted from the inclined surface 12c of the light guide plate 12 could be made incident again on the light guide plate 12. This is conceivably the reason that light use efficiency could be improved, which led to an increase in the luminance of the liquid crystal display panel 2.

Second Embodiment

Figure 5:
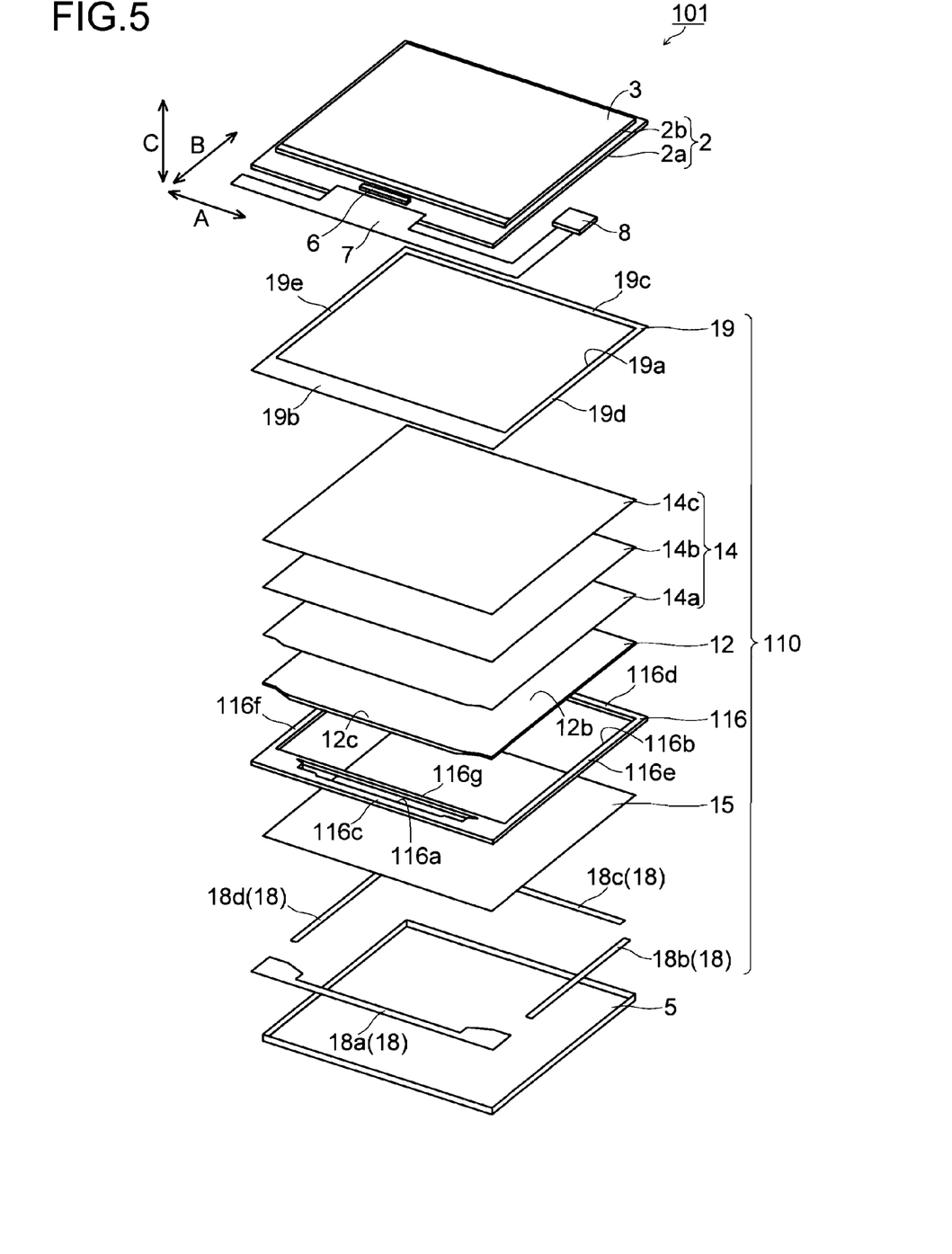
FIG. 5 An exploded perspective view showing the structure of a liquid crystal display device provided with a backlight device according to a second embodiment of the present invention.
Figure 6:
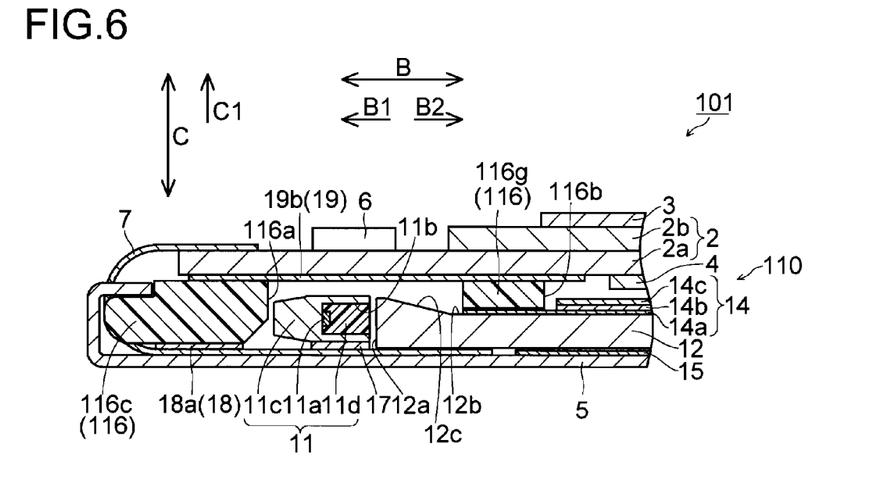
FIG. 6 A cross-sectional view showing the structure of the liquid crystal display device provided with the backlight device according to the second embodiment of the present invention, which is shown in FIG. 5.
Figure 7:
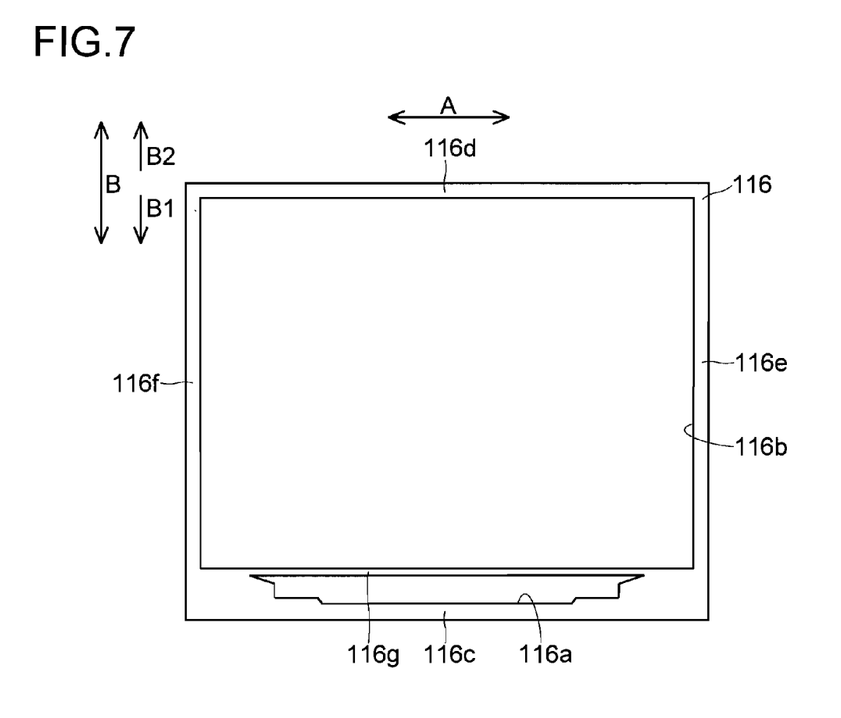
FIG. 7 A plan view showing the structure of a frame of the backlight device shown in FIG. 5.

Referring to FIGS. 5 to 7, this second embodiment describes a case where, unlike the previously described first embodiment, a restriction portion (restriction member) 116g is formed integrally with a frame 116.

In a backlight device 110 of a liquid crystal display device 101 according to the second embodiment of the present invention, as shown in FIGS. 5 and 7, the resinous frame 116 has two openings 116a and 116b. Furthermore, the frame 116 is formed in the shape of a frame defined by long side portions 116c and 116d and short side portions 116e and 116f.

Furthermore, in the second embodiment, as shown in FIG. 7, the restriction portion 116g is formed integrally with the long side portion 116c of the frame 116, and the opening 116a and the opening 116b are separated from each other by the restriction portion 116g. The restriction portion 116g is an example of the "restriction member" of the present invention.

Furthermore, as shown in FIG. 6, similarly to the previously described first embodiment, the restriction portion 116g is disposed in opposition to a light output surface 12b of a light guide plate 12. Furthermore, the restriction portion 116g (frame 116) is in white color and has a function of reflecting light and a light-blocking property.

Furthermore, similarly to the previously described first embodiment, the restriction portion 116g has a function of restricting the light guide plate 12 from being moved in the thickness direction of the light guide plate 12 (C direction). Specifically, the restriction portion 116g is formed so that a distance (e.g. several tens of μm) between the light output surface 12b of the light guide plate 12 (diffusion sheet 14a) and the restriction portion 116g is smaller than a distance between a portion of the light guide plate 12 on the side of a light incidence surface 12a and an adhesive member 19. Thus, the light guide plate 12 is restricted from being moved in the thickness direction (C direction).

Furthermore, the restriction portion 116g is formed so as to have a rectangular cross section. In the second embodiment, the restriction portion 116g, therefore, is not disposed forward (C1 direction) of the portion of the light guide plate 12 on the side of the light incidence surface 12b. The restriction portion 116g may also be formed so as to have an L-shaped cross section so that part of the restriction portion 116g is disposed forward of the portion of the light guide plate 12 on the side of the light incidence surface 12b. In this case, it is not required to form the opening 116a in the frame 116.

Other components of the second embodiment are structured similarly to those in the previously described first embodiment.

In the second embodiment, as described in the foregoing, the restriction portion 116g is formed integrally with the frame 116, and thus, compared with a case where the restriction portion 116g is formed as a separate body from the frame 116, it is easily possible to prevent the restriction portion 116g from being moved relative to the light guide plate 12 and the like. Furthermore, the number of components used can be reduced, and the assembly process can be simplified.

Other effects of the second embodiment are similar to those of the previously described first embodiment.

Third Embodiment

Figure 8:
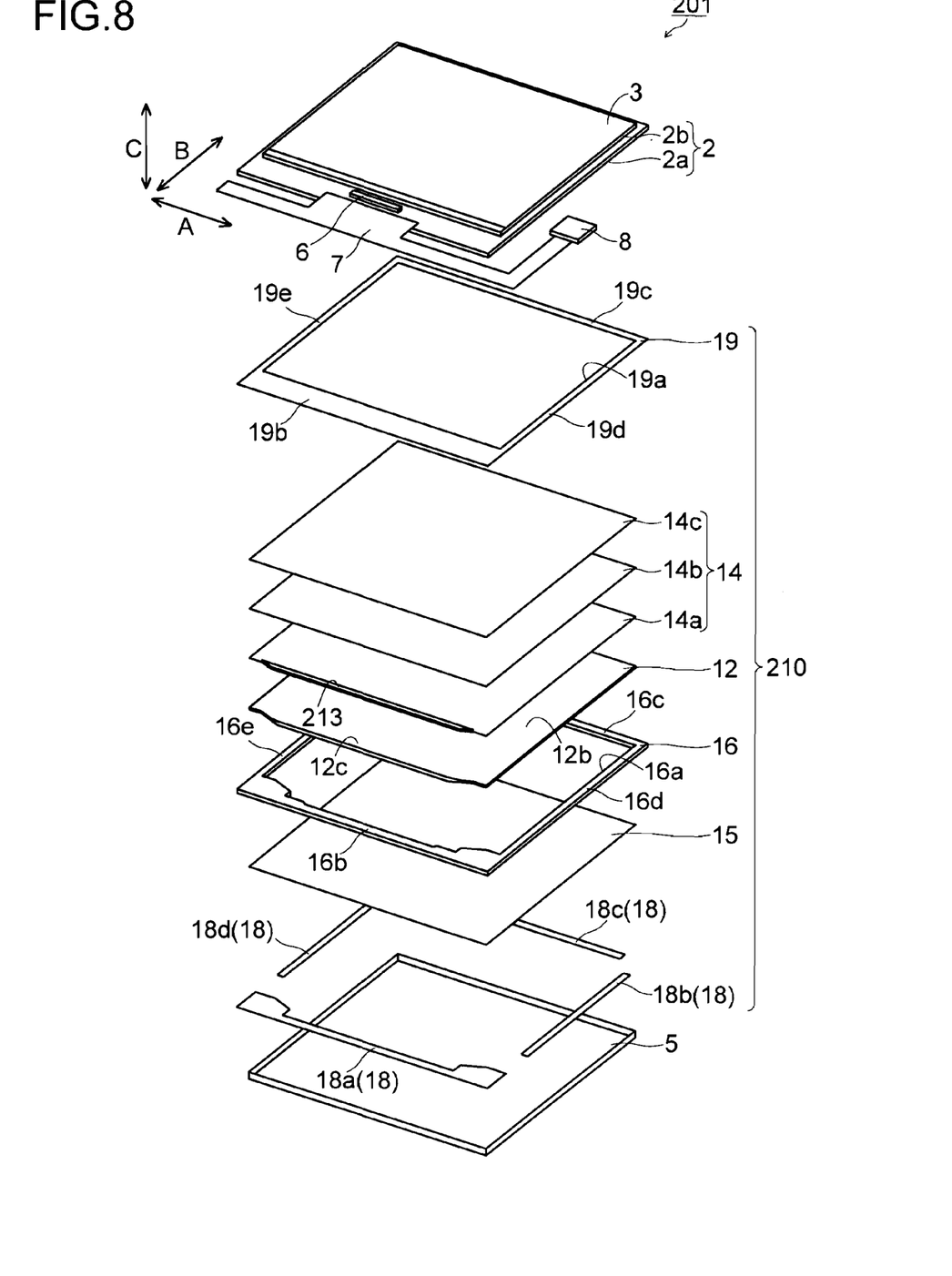
FIG. 8 An exploded perspective view showing the structure of a liquid crystal display device provided with a backlight device according to a third embodiment of the present invention.
Figure 9:
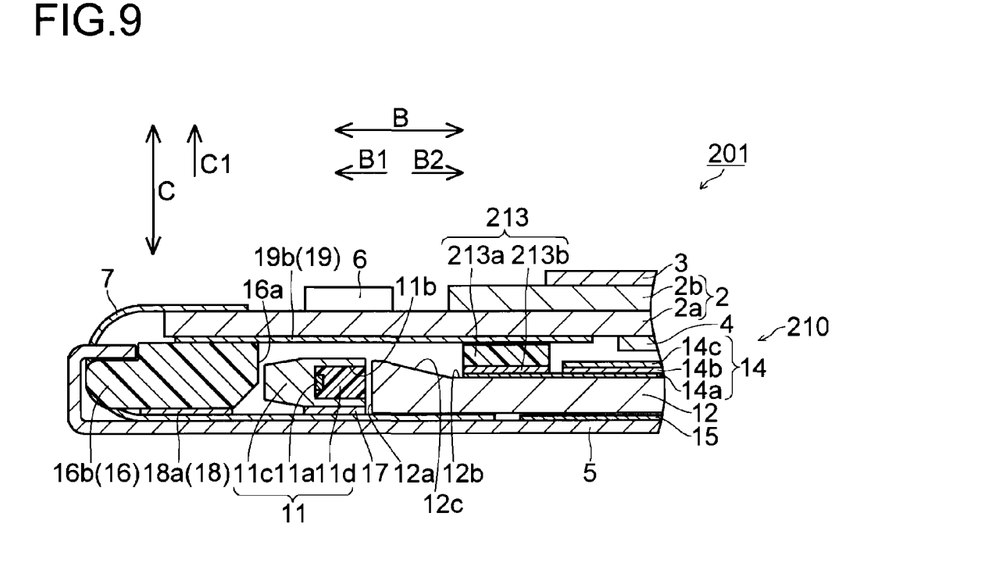
FIG. 9 A cross-sectional view showing the structure of the liquid crystal display device provided with the backlight device according to the third embodiment of the present invention, which is shown in FIG. 8.

Referring to FIGS. 8 and 9, this third embodiment describes a case where, unlike the previously described first and second embodiments, a restriction member 213 is fixed to a diffusion sheet 14a (optical sheets 14).

In a backlight device 210 of a liquid crystal display device 201 according to the third embodiment of the present invention, as shown in FIGS. 8 and 9, the restriction member 213 is fixed (bonded) to an end portion of the diffusion sheet 14a on the side of LEDs 11 (B1 direction).

Specifically, the restriction member 213 is composed of a sheet member 213a made of a resin such as, for example, white PET and an adhesive member 213b and is formed so as to have a rectangular cross section. The adhesive member 213b is made of a double-sided adhesive tape or the like and has a function of fixing the sheet member 213a to the diffusion sheet 14a.

In the third embodiment, in assembling the backlight device 210, the diffusion sheet 14a with the restriction member 213 fixed to a predetermined position thereof is prepared beforehand. In a state where a light guide plate 12 is disposed in an opening 16a of a frame 16, a plurality of the optical sheets 14 (diffusion sheet 14a) are disposed forward (C1 direction) of a light output surface 12b of the light guide plate 12. At this time, since the restriction member 213 is fixed to the diffusion sheet 14a, the restriction member 213 is prevented (restricted) from being moved in the plane direction (A direction and B direction).

Furthermore, in the third embodiment, the restriction member 213 is formed so as to have a rectangular cross section and, therefore, is not disposed forward of a portion of the light guide plate 12 on the side of a light incidence surface 12b. Similarly to the previously described first embodiment, the restriction member 213 may also be formed so as to have an L-shaped cross section so that part of the restriction member 213 is disposed forward of the portion of the light guide plate 12 on the side of the light incidence surface 12b.

Furthermore, similarly to the previously described first embodiment, the restriction member 213 has a function of restricting the light guide plate 12 from being moved in the thickness direction of the light guide plate 12 (C direction). Specifically, the restriction member 213 is formed so that a distance (e.g. several tens of μm) between the restriction member 213 and an adhesive member 19 is smaller than a distance between the portion of the light guide plate 12 on the side of the light incidence surface 12a and the adhesive member 19. Thus, the light guide plate 12 is restricted from being moved in the thickness direction (C direction).

Other components of the third embodiment are structured similarly to those in the previously described first embodiment.

In the third embodiment, as described in the foregoing, the restriction member 213 is fixed to the diffusion sheet 14a. Thus, the restriction member 213 can be prevented from being moved relative to the diffusion sheet 14a, and the positional accuracy of the restriction member 213 with respect to the light guide plate 12 can be improved.

Furthermore, in the third embodiment, as described in the foregoing, in assembling the backlight device 210, the diffusion sheet 14a with the restriction member 213 fixed to a predetermined position thereof is prepared beforehand and then is disposed forward (C1 direction) of the light output surface 12b of the light guide plate 12. Thus, simply by disposing the diffusion sheet 14a at a predetermined position, the restriction member 213 can also be disposed at a predetermined position, so that the assembly process can be simplified.

Other effects of the third embodiment are similar to those of the previously described first embodiment.

The embodiments disclosed in this application are to be considered in all respects as illustrative and not limiting. The scope of the present invention is indicated by the appended claims rather than by the foregoing description of the embodiments, and all changes which come within the meaning and range of equivalency of the claims are intended to be embraced therein.

For example, each of the previously described embodiments shows an example adopting a liquid crystal display device as the display device. The present invention, however, is not limited thereto and may be applied also to display devices of other types than a liquid crystal display device.

Furthermore, each of the previously described embodiments shows a case where the liquid crystal display device is used in electronic equipment such as a mobile telephone. The present invention, however, is not limited thereto, and the liquid crystal display device may be used also in electronic equipment of any other type than a mobile telephone.

Furthermore, each of the previously described embodiments shows an example in which an LED including a blue light-emitting chip is used as the light-emitting element. The present invention, however, is not limited thereto, and an LED including a light-emitting chip of any other type than a blue light-emitting chip may also be used, or a light-emitting element of any other type than an LED may also be used.

Furthermore, each of the previously described embodiments shows an example using the resinous restriction member. The present invention, however, is not limited thereto, and a restriction member made of a material other than resin may also be used.

Furthermore, each of the previously described embodiments shows an example in which the restriction member is formed in white color. The present invention, however, is not limited thereto, and the restriction member may be formed also in, for example, silver color having a relatively high reflectivity or in, for example, black color having a relatively low reflectivity. Furthermore, the restriction member may also be formed so as not to have a function of reflecting light.

Furthermore, each of the previously described embodiments shows an example in which the restriction member is formed so as to have a cross section of an L shape or a rectangular shape. The present invention, however, is not limited thereto, and the restriction member may also be formed so as to have a cross section of, for example, a trapezoidal shape other than an L shape and a rectangular shape.

Furthermore, the previously described first embodiment shows an example in which the restriction member is formed by bonding the wide sheet member to the narrow sheet member. The present invention, however, is not limited thereto, and the restriction member may also be formed by resin molding using a mold.

Furthermore, the previously described first embodiment shows an example in which the restriction member is formed by bonding the wide sheet member to the narrow sheet member, which are identical in thickness. The present invention, however, is not limited thereto, and the restriction member may also be formed by bonding a wide sheet member to a narrow sheet member, which are different in thickness.

Furthermore, each of the previously described first and second embodiments shows an example in which the diffusion sheet is disposed between the restriction member (restriction portion) and the light guide plate. The present invention, however, is not limited thereto and may also be configured so that the diffusion sheet is reduced in length and not disposed between the restriction member (restriction portion) and the light guide plate.

Furthermore, each of the previously described first and second embodiments shows an example in which the restriction member (restriction portion) is disposed at a predetermined distance from the light guide plate and the diffusion sheet, and the previously described third embodiment shows an example in which the restriction member is disposed at a predetermined distance from the adhesive member 19. The present invention, however, is not limited thereto, and the restriction member (restriction portion) may also be disposed in contact with the light guide plate, the diffusion sheet, and the adhesive member 19.

Furthermore, the previously described third embodiment shows an example in which the restriction member is fixed to the diffusion sheet. The present invention, however, is not limited thereto, and the restriction member may also be fixed to the upper lens sheet, the lower lens sheet, or the like.

Furthermore, each of the previously described embodiments shows an example in which the inclined surface of the light guide plate is formed so as to be inclined at 12° with respect to the light output surface. The present invention, however, is not limited thereto, and the inclined surface of the light guide plate may also be formed so as to be inclined at an angle larger or smaller than 12° with respect to the light output surface.

| List of Reference Signs | |
|---|---|
| 1, 101, 201 | Liquid crystal display device (Display device) |
| 2 | Liquid crystal display panel (Display panel) |
| 10, 110, 210 | Backlight device |
| 11 | LED (Light-emitting element) |
| 11a | Blue light-emitting chip (Light-emitting chip) |
| 11b | Concave portion |
| 11c | Package main body portion |
| 11d | Filler |
| 12 | Light guide plate |
| 12a | Light incidence surface |
| 12b | Light output surface |
| 12c | Inclined surface |
| 13, 213 | Restriction member |
| 13a | Wide sheet member |
| 13b | Narrow sheet member |
| 14 | Optical sheet |
| 14a | Diffusion sheet |
| 16, 116 | Frame |
| 19 | Adhesive member |
| 116g | Restriction portion (Restriction member) |

The invention claimed is:

1. A backlight device of a sidelight type, comprising:
a light-emitting element;
a light guide plate that includes a light incidence surface on which light from the light-emitting element becomes incident and a light output surface from which incident light is outputted to a side of a display panel;
an optical sheet that is disposed in opposition to the light output surface of the light guide plate; and
a resinous frame that houses the light-emitting element, the light guide plate, and the optical sheet, wherein
an inclined surface inclined with respect to the light output surface is formed between the light incidence surface and the light output surface of the light guide plate,
the light guide plate is formed so as to have a thickness larger at a portion on a side of the light incidence surface than at a portion on a side of the light output surface,
a restriction member that has a light-blocking property and restricts the light guide plate from being moved in a thickness direction of the light guide plate is disposed forward of a portion of the light output surface of the light guide plate on a side of the light incidence surface, and
the restriction member is formed integrally with the frame.

2. The backlight device according to claim 1, further comprising:
an adhesive member for fixing the display panel to the frame,
wherein the restriction member is bonded to the adhesive member.

3. The backlight device according to claim 1, wherein the restriction member has a function of reflecting light.

4. The backlight device according to claim 1, further comprising:
an adhesive member for fixing the display panel to the frame,
wherein at least part of the adhesive member is disposed forward of the light incidence surface of the light guide plate, and
a distance between the light output surface of the light guide plate or the optical sheet and the restriction member is smaller than a distance between the portion of the light guide plate on the side of the light incidence surface and the adhesive member.

5. The backlight device according to claim 1, wherein the light-emitting element comprises:
a light-emitting chip;
a package main body portion that has a concave portion for housing the light-emitting chip; and
a filler that is filled in the concave portion of the package main body portion so as to cover the light-emitting chip, and
the light incidence surface of the light guide plate is formed so as to extend to a position more forward than the concave portion of the package main body portion.

6. A display device, comprising:
the backlight device according to claim 1; and
a display panel that is illuminated by the backlight device.

7. A backlight device of a sidelight type, comprising:
a light-emitting element;
a light guide plate that includes a light incidence surface on which light from the light-emitting element becomes incident and a light output surface from which incident light is outputted to a side of a display panel; and
an optical sheet that is disposed in opposition to the light output surface of the light guide plate, wherein
an inclined surface inclined with respect to the light output surface is formed between the light incidence surface and the light output surface of the light guide plate,
the light guide plate is formed so as to have a thickness larger at a portion on a side of the light incidence surface than at a portion on a side of the light output surface,
a restriction member that has a light-blocking property and restricts the light guide plate from being moved in a thickness direction of the light guide plate is disposed forward of a portion of the light output surface of the light guide plate on a side of the light incidence surface, and
the restriction member is fixed to the optical sheet.

8. The backlight device according to claim 7, wherein the optical sheet comprises a diffusion sheet disposed in contact with the light output surface of the light guide plate, and
the restriction member is fixed to the diffusion sheet.

9. A display device, comprising:
the backlight device according to claim 7; and
a display panel that is illuminated by the backlight device.

10. The backlight device according to claim 7, further comprising:
a frame that houses the light-emitting element, the light guide plate, and the optical sheet; and
an adhesive member for fixing the display panel to the frame,
wherein the restriction member is bonded to the adhesive member.

11. The backlight device according to claim 7, wherein the restriction member has a function of reflecting light.

12. The backlight device according to claim 7, further comprising:
a frame that houses the light-emitting element, the light guide plate, and the optical sheet; and
an adhesive member for fixing the display panel to the frame,
wherein at least part of the adhesive member is disposed forward of the light incidence surface of the light guide plate, and
a distance between the light output surface of the light guide plate or the optical sheet and the restriction member is smaller than a distance between the portion of the light guide plate on the side of the light incidence surface and the adhesive member.

13. The backlight device according to claim 7, wherein the light-emitting element comprises:
a light-emitting chip;
a package main body portion that has a concave portion for housing the light-emitting chip; and
a filler that is filled in the concave portion of the package main body portion so as to cover the light-emitting chip, and
the light incidence surface of the light guide plate is formed so as to extend to a position more forward than the concave portion of the package main body portion.

14. A backlight device of a sidelight type, comprising:
a light-emitting element;
a light guide plate that includes a light incidence surface on which light from the light-emitting element becomes incident and a light output surface from which incident light is outputted to a side of a display panel; and
an optical sheet that is disposed in opposition to the light output surface of the light guide plate, wherein
an inclined surface inclined with respect to the light output surface is formed between the light incidence surface and the light output surface of the light guide plate,
the light guide plate is formed so as to have a thickness larger at a portion on a side of the light incidence surface than at a portion on a side of the light output surface,
a restriction member that has a light-blocking property and restricts the light guide plate from being moved in a thickness direction of the light guide plate is disposed forward of a portion of the light output surface of the light guide plate on a side of the light incidence surface, and
the restriction member is formed by bonding a wide sheet member disposed forward of the light incidence surface and the light output surface of the light guide plate to a narrow sheet member disposed forward of the light output surface of the light guide plate.

15. The backlight device according to claim 14, further comprising:
a frame that houses the light-emitting element, the light guide plate, and the optical sheet,
wherein the frame has a function of preventing the wide sheet member of the restriction member from being moved in a plane direction of the wide sheet member.

16. A display device, comprising:
the backlight device according to claim 14; and
a display panel that is illuminated by the backlight device.

17. The backlight device according to claim 14, further comprising:
a frame that houses the light-emitting element, the light guide plate, and the optical sheet; and
an adhesive member for fixing the display panel to the frame,
wherein the restriction member is bonded to the adhesive member.

18. The backlight device according to claim 14, wherein the restriction member has a function of reflecting light.

19. The backlight device according to claim 14, further comprising:
a frame that houses the light-emitting element, the light guide plate, and the optical sheet; and
an adhesive member for fixing the display panel to the frame,
wherein at least part of the adhesive member is disposed forward of the light incidence surface of the light guide plate, and
a distance between the light output surface of the light guide plate or the optical sheet and the restriction member is smaller than a distance between the portion of the light guide plate on the side of the light incidence surface and the adhesive member.

20. The backlight device according to claim 14, wherein the light-emitting element comprises:
a light-emitting chip;
a package main body portion that has a concave portion for housing the light-emitting chip; and
a filler that is filled in the concave portion of the package main body portion so as to cover the light-emitting chip, and
the light incidence surface of the light guide plate is formed so as to extend to a position more forward than the concave portion of the package main body portion.

* * * * *